(12) United States Patent
Musselman et al.

(10) Patent No.: US 7,249,617 B2
(45) Date of Patent: Jul. 31, 2007

(54) VEHICLE MOUNTED COMPRESSED AIR DISTRIBUTION SYSTEM

(76) Inventors: Brett A. Musselman, 4998 Old Easton Rd., Doylestown, PA (US) 18901; Curtis G. Kuder, 5566A Silo Hill Rd., P.O. Box 256, Plumsteadville, PA (US) 18949

( * ) Notice: Subject to any disclaimer, the term of this patent is extended or adjusted under 35 U.S.C. 154(b) by 422 days.

(21) Appl. No.: 10/968,174

(22) Filed: Oct. 20, 2004

(65) Prior Publication Data

US 2006/0081289 A1    Apr. 20, 2006

(51) Int. Cl.
*B65B 1/04* (2006.01)

(52) U.S. Cl. ............... 141/231; 141/95; 128/200.24; 169/30; 280/4

(58) Field of Classification Search ........ 141/231, 141/94, 95, 192, 198, 100–104; 222/129, 222/608; 73/29.01, 31.04; 128/200.24; 169/30, 11, 14; 280/4
See application file for complete search history.

(56) References Cited

U.S. PATENT DOCUMENTS

| | | | |
|---|---|---|---|
| 4,165,738 A | * | 8/1979 | Graves et al. ......... 128/202.13 |
| 4,866,594 A | | 9/1989 | David et al. |
| 5,159,839 A | * | 11/1992 | Silber et al. ............ 73/714 |
| 5,220,517 A | | 6/1993 | Sierk et al. |
| 5,570,685 A | * | 11/1996 | Turiello ............. 128/202.13 |
| 5,858,064 A | * | 1/1999 | Delp, II .............. 95/12 |
| 6,252,505 B1 | | 6/2001 | Bade |
| 6,276,459 B1 | * | 8/2001 | Herrick et al. ........... 169/14 |
| 6,553,336 B1 | | 4/2003 | Johnson et al. |
| 6,786,245 B1 | * | 9/2004 | Eichelberger et al. ....... 141/4 |
| 6,915,965 B2 | * | 7/2005 | Siebert ............... 239/270 |
| 6,941,946 B2 | * | 9/2005 | Baker ............... 128/202.27 |
| 2003/0158698 A1 | | 8/2003 | Glazerbrook |

\* cited by examiner

*Primary Examiner*—Steven O. Douglas
(74) *Attorney, Agent, or Firm*—Gregory J. Gore

(57) ABSTRACT

A pressurized gas system controls a gas flow from one or more gas pressure storage vessels by means of an electronically controlled electro-mechanical shut-off valve located in close proximity to each of the vessels. The shut-off valves are electrically wired to actuation switches on the control panel. Pressure transducers mounted on each vessel provide a signal output which is electrically connected to a digital numeric display located on the control panel so that the pressure of each vessel can be monitored. Gas flow from the vessels is controlled by means of the electric shut-off valves operated from the control panel. A pressure regulator at the air access station controls the final output pressure delivered to the tool or personnel air bottle.

5 Claims, 3 Drawing Sheets

VEHICLE MOUNTED COMPRESSED AIR DISTRIBUTION SYSTEM

FIELD OF THE INVENTION

The present invention relates to mobile compressed air systems, more specifically for compressed air monitoring and delivery systems used on rescue type vehicles such as fire trucks.

BACKGROUND OF THE INVENTION

Rescue type vehicles such as fire trucks often carry a supply of compressed air which is contained in a bank of pressurized vessels or cylinders. The compressed air cylinders are housed on the vehicle in a remote storage compartment. Pressurized lines run from each cylinder to a panel of pressure gauges and controls usually located on the side of the truck. The cylinders are plumbed in parallel and have feed lines which run to a compressed air station on the truck adjacent the control panel. Rescue personnel carry backpack mounted air bottles which supply their individual personal breathing apparatus. As these air bottles become depleted, they are refilled at the truck compressed air station. The compressed air is also used to power hand tools and for other purposes.

Pressure of the supply cylinders on the fire truck is monitored by the gauges on the control panel. As the compressed air is used, the cylinders are switched from one to another in a cascade fashion as the pressure in each cylinder drops below a given point to ensure that the fill station is at all times provided with air of sufficient quantity and pressure. Manual valves on the control panel are turned to release air from each cylinder as needed. The problem with this arrangement is that each supply cylinder has a separate live air hose running to a gauge on the control panel and then lines to the air station. This system uses a great deal of air hose plumbing which takes up space, adds weight, and requires constant maintenance since leaks may develop in the myriad of air lines which travel to and from the supply cylinders to the control panel and then from the control panel to the fill station. This is detrimental to the fire truck in which space and weight are at a premium. Reliability is also of paramount importance for rescue vehicles. There is therefore a need in the art of rescue vehicles for a more efficient, compact, lighter weight, and more reliable system for monitoring, regulating, and delivering air from the reservoir tanks to the compressed air access station.

SUMMARY OF THE INVENTION

In order to fulfill the needs in the art described above with regard to mobile compressed air distribution systems, the present invention has been devised. According to the invention, a pressurized gas system controls a gas flow from one or more gas pressure storage vessels by means of an electronically controlled electromechanical shut-off valve located in close proximity to each of the vessels. The shut-off valves are electrically wired to actuation switches on the control panel. Pressure transducers mounted on each vessel provide a signal output which is electrically connected to a digital numeric display located on the control panel so that the pressure of each vessel can be monitored. Gas flow from the vessels is controlled by means of the electric shut-off valves operated from the control panel. A pressure regulator at the air access station controls the final output pressure delivered to the tool or personnel air bottle.

In this way, the vessel pressures may be monitored without pressurized lines running between each vessel and the control panel. Also, the mechanical liquid filled dial-type gauges typically used are replaced with digital numeric read-outs which are more reliable and self-illuminating. Thereby, all of the prior art hoses running to and from the control panel are replaced by a wiring harness which is much more compact and reliable. Replacing the pressurized air hoses with electrical wiring also allows greater flexibility for the location of the compressed air vessels on the truck. The system is powered by the 12-volt electrical supply already present on the truck.

More specifically, the applicant has invented a mobile compressed air system comprising a vehicle carrying a plurality of vessels containing compressed air, the vehicle further including a compressed air access station. A control panel located at the compressed air station includes an electrical pressure display and electrical switch means. A plurality of first air conduits connects each of the vessels to one of a plurality of electromechanical shut-off valves. A plurality of second air conduits leads from an output side of each of the electromechanical valves to a single main air output line. The output line leads to pressure regulator means located at the air access station. A plurality of pressure transducers is located on each of the first air conduits, the transducers including electrical signal output means responsive to the pressure in each vessel. Each of the electrical output signals from each of the pressure transducers connects to the display means at the control panel. Electrical switch means on the control panel are electrically connected to each of the electromechanical shut-off valves such that compressed air fed to the main air output line may be switched from one vessel to another. The pressure display preferably includes a plurality of digital read-outs which show the pressure of each vessel individually.

It is therefore an object of the present invention to provide a vehicle mounted air distribution system which saves space and weight. A further object of the present invention is to create a compact air distribution system for a vehicle which is extremely reliable and easy to maintain. Other objects and advantages of the invention will become apparent to those of skill in the art from the following drawings and description of the preferred embodiment.

DESCRIPTION OF THE PREFERRED EMBODIMENT

Figure 1:
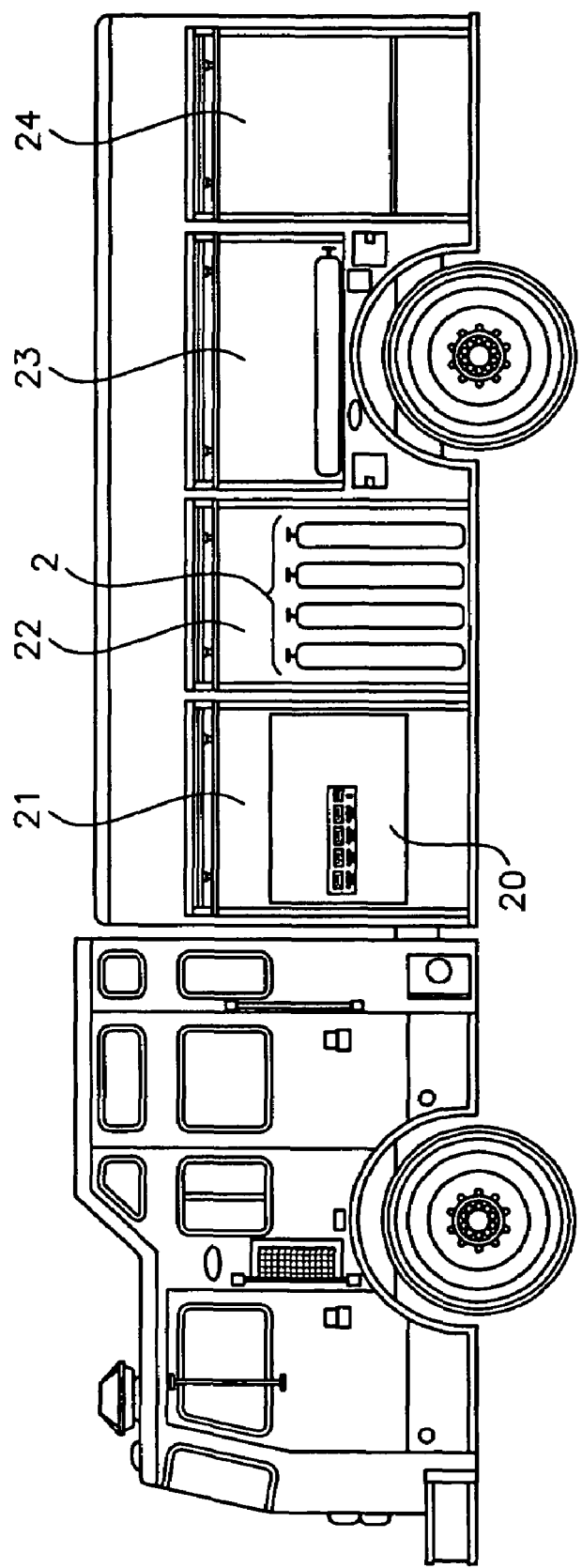
FIG. 1 depicts a side elevation view of a fire truck which utilizes the air distribution system of the present invention.

Referring now to FIG. 1, a fire truck that utilizes the air distribution of the present invention is shown. The fire truck includes compartments 21, 22, 23 and 24 which may be used for storage of various items such as compressed air cylinders 2. Compartment 21 in this drawing functions as an air access station which includes control panel 20 that has monitoring and control means for distributing compressed air. Compressed air is typically used by fire trucks to refill rescue personnel backpack-mounted air bottles, to power hand tools, and for other purposes. The compressed air for distribution, as shown in this embodiment, is stored in a bank of cylinders 2 which occupy compartment 22 remote from the compressed air access station of compartment 21.

Figure 2:
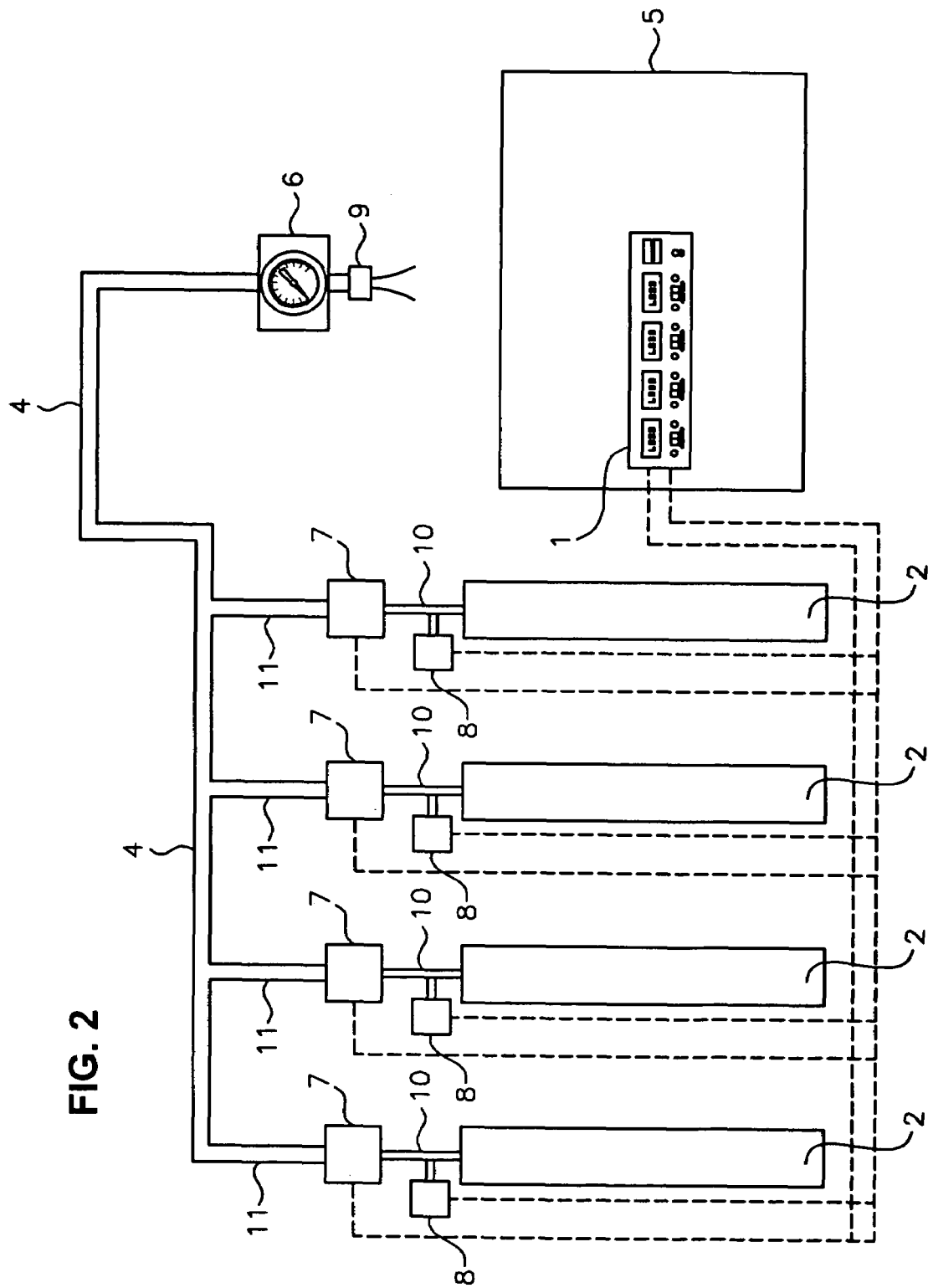
FIG. 2 is a pneumatic and electrical diagram depicting the main components of the invention.

Referring now to FIG. 2, this diagram depicts the compressed air distribution system of the invention in which compressed air from cylinders 2 is fed to fill port 9 monitored and controlled by control panel 5. Each air cylinder includes identical components for delivery of air to line 11 so that the description of one cylinder and its related components need only be described for complete understanding of the functioning of the entire bank of air cylinders. Referring now to the leftmost air cylinder 2, it includes a first conduit 10 that passes air to an electromechanical shut-off valve 7 and a pressure transducer 8. Line 11 leads from the discharge of the electromechanical valve to a main air line 4 that connects to a pressure regulator 6. Regulated air from the regulator is accessible through valved port 9.

With regard to the electrical connection between the bank of air cylinders and control panel 5, each cylinder is identically wired so that the description of one cylinder only will convey the understanding of the electrical connections between the control panel and all cylinders in the entire bank of air cylinders. As shown in FIG. 2, by way of illustration, an electromechanical shut-off valve and pressure transducer of each of the cylinders is wired as indicated by the dotted lines to a digital read-out panel 1 located on the control panel 5. More detail on this portion of the control panel is shown in FIG. 3.

Figure 3:
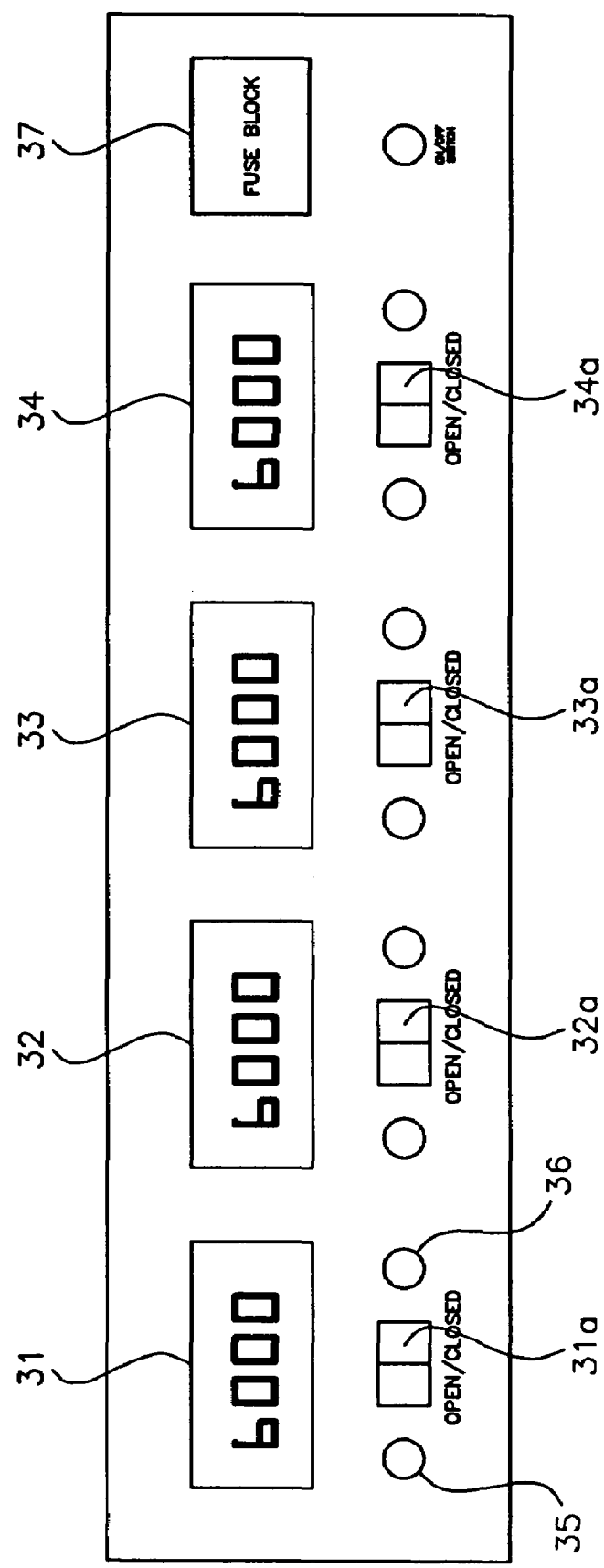
FIG. 3 is a portion of the control panel of the present invention.

Referring now to FIG. 3 the digital read-out panel, a portion of the control panel associated with the present invention, is shown. Digital read-outs 31, 32, 33, and 34 are individually connected to the pressure transducer for displaying the pressure of air in each cylinder. Associated switch means 31a, 32a, 33a, and 34a are electrically connected to each of the electromechanical shut-off valves associated with each air cylinder. As shown in this drawing, the switch means are rocker-type switches having opened and closed positions. In the preferred embodiment, the opened and closed positions are depicted by colored lights 35 and 36 adjacent each switch preferably having green and red colors which illuminate, indicating position of each switch. Fuse block 37 is included between the digital read-out panel electrics and the electrical power source.

It will therefore be understood by those of ordinary skill in the art that the objects of the invention have been achieved by the embodiment of the invention described above. It should be understood that there may be other modifications and changes to the present invention that will be obvious to those of skill in the art from the foregoing description, however, the present invention should be limited only by the following claims and their legal equivalents.

The invention claimed is:

1. A mobile compressed air system, comprising:
   a vehicle carrying a plurality of vessels containing compressed air, said vehicle further including a compressed air access station;
   a control panel located at said compressed air access station and including electrical pressure display and electrical switch means;
   a plurality of first air conduits connecting each of said vessels to one of a plurality of electromechanical shut-off valves;
   a plurality of second air conduits leading from an output side of each of said electromechanical valves to a single main air output line, said output line leading to pressure regulator means located at said air access station;
   a plurality of pressure transducers located on each of said first air conduits, said transducers including electrical signal output means responsive to the pressure in each vessel, each of said electrical output signals from each of said pressure transducers connected to said display means at said control panel; and
   said electrical switch means on said control panel electrically connected to each of said electromechanical shut-off valves such that compressed air fed to said main air output line may be switched from one vessel to another.

2. The mobile compressed air system of claim 1 wherein said vessels are located in a storage compartment remote from said compressed air access station.

3. The mobile compressed air system of claim 2 wherein said display includes a digital numeric read-out.

4. The mobile compressed air system of claim 3 wherein said display means include individual read-outs corresponding to each vessel.

5. The mobile compressed air system of claim 4 wherein said vehicle is a fire truck.

* * * * *